(12) United States Patent
Qin et al.

(10) Patent No.: US 11,060,467 B2
(45) Date of Patent: Jul. 13, 2021

(54) ELECTRICALLY CONTROLLED PNEUMATIC SURGE PREVENTION DEVICE AND CONTROL METHOD

(71) Applicant: GUANGXI YUCHAI MACHINERY CO., LTD., Guangxi (CN)

(72) Inventors: Yufeng Qin, Guangxi (CN); Dezhong Ning, Guangxi (CN); Li Sheng, Guangxi (CN); Zonghui Tan, Guangxi (CN); Zhizhi Liu, Guangxi (CN); Shuangchao Ye, Guangxi (CN)

(73) Assignee: GUANGXI YUCHAI MACHINERY CO., LTD., Guangxi (CN)

( * ) Notice: Subject to any disclaimer, the term of this patent is extended or adjusted under 35 U.S.C. 154(b) by 78 days.

(21) Appl. No.: 16/467,991

(22) PCT Filed: Oct. 23, 2017

(86) PCT No.: PCT/CN2017/106275
§ 371 (c)(1),
(2) Date: Jun. 10, 2019

(87) PCT Pub. No.: WO2018/149162
PCT Pub. Date: Aug. 23, 2018

(65) Prior Publication Data
US 2020/0072140 A1 Mar. 5, 2020

(30) Foreign Application Priority Data

Feb. 17, 2017 (CN) .......................... 201710088316.4

(51) Int. Cl.
*F02D 41/00* (2006.01)
*F02D 9/02* (2006.01)
(Continued)

(52) U.S. Cl.
CPC .......... *F02D 41/0007* (2013.01); *F02D 9/02* (2013.01); *F02D 41/107* (2013.01);
(Continued)

(58) Field of Classification Search
CPC ................................................ F02M 35/10236
See application file for complete search history.

(56) References Cited

U.S. PATENT DOCUMENTS 5,155,999 A * 10/1992 Hashimoto ............. F02B 33/44
60/611
2015/0315963 A1* 11/2015 Graichen ............. G05D 7/0635
415/148

FOREIGN PATENT DOCUMENTS

CN        201874673        6/2011
CN        103867420        6/2014
(Continued)

OTHER PUBLICATIONS

"International Search Report (Form PCT/ISA/210) of PCT/CN2017/106275," dated Jan. 26, 2018, with English translation thereof, pp. 1-4.

*Primary Examiner* — Hung Q Nguyen
*Assistant Examiner* — Mark L. Greene
(74) *Attorney, Agent, or Firm* — JCIP Global Inc.

(57) ABSTRACT

An electrically controlled pneumatic surge prevention device includes a controller, an air filter, a turbocharger, an intercooler, a throttle valve, air pipes, an electromagnetic valve connected using signals to the controller, and a surge prevention valve connected to the electromagnetic valve. The surge prevention valve is connected to a sixth air pipe connecting the intercooler and the throttle valve via a fourth air pipe. The electromagnetic valve is arranged at a third air pipe, and the surge prevention valve is connected to a second air pipe connecting the air filter and the turbocharger via the
(Continued)

third air pipe. Also provided is a control method of an electrically controlled pneumatic surge prevention device.

10 Claims, 4 Drawing Sheets

(51) Int. Cl.
*F02D 41/10* (2006.01)
*F02M 35/10* (2006.01)
*F16K 17/18* (2006.01)
*F16K 31/42* (2006.01)
*F02B 29/04* (2006.01)
*F02M 35/024* (2006.01)

(52) U.S. Cl.
CPC .............................. *F02M 35/10144* (2013.01); *F02M 35/10157* (2013.01); *F02M 35/10236* (2013.01); *F02M 35/10255* (2013.01); *F16K 17/18* (2013.01); *F16K 31/42* (2013.01); *F02B 29/04* (2013.01); *F02D 2009/0235* (2013.01); *F02M 35/024* (2013.01)

(56) References Cited

FOREIGN PATENT DOCUMENTS

| | | |
|---|---|---|
| CN | 204646409 | 9/2015 |
| CN | 205841780 | 12/2016 |
| CN | 106640347 | 5/2017 |
| CN | 206448870 | 8/2017 |
| KR | 20050092515 | 9/2005 |

* cited by examiner

ELECTRICALLY CONTROLLED PNEUMATIC SURGE PREVENTION DEVICE AND CONTROL METHOD

CROSS-REFERENCE TO RELATED APPLICATION

This is a 371 application of the International PCT application serial no. PCT/CN2017/106275, filed on Oct. 23, 2017 which claims the priority benefits of China Application No. 201710088316.4 filed on Feb. 17, 2017. The entirety of each of the above-mentioned patent applications is hereby incorporated by reference herein and made a part of this specification.

BACKGROUND OF THE INVENTION

1. Field of the Invention

The present invention relates to the field of power, in particular, to an electrically controlled pneumatic surge prevention device, and also to an electrically controlled pneumatic surge prevention control method.

2. Description of Related Art

Harmful emissions of engines are a major source of air pollution. As importance of environmental prevention issues increases, a goal of reducing harmful emissions and CO2 emissions from engines has become an important direction for engine development in the world today. Therefore, it is a primary task of all engine designers to carry out engine fuel economy improvement and control methods and technical studies on harmful emissions such as NOx and THC. As a main means to improve engine economy and reduce engine emissions, a supercharging technology has been fully applied to gas engines meeting the National IV emission standard. However, as requirements of the regulations become stricter and requirements of users for the power and driving comfort of vehicles are increasing, in order to cope with various needs and improve responsiveness and efficiency of superchargers, a small-rotational inertia supercharger becomes a current mainstream control technology. However, the improved efficiency of the matched small-inertia supercharger will reduce the surge margin of the supercharger. For an engine with an air input throttle (throttle valve), when the throttle valve is suddenly released, the supercharger is prone to surge. In this case, a surge prevention valve is required to be installed, and air is discharged via the surge prevention valve when the throttle valve is suddenly released, so that the effect of removing surge is achieved. However, there are two main types of conventional surge prevention valves. One is turned on by sensing a pressure difference between both sides of the throttle valve via a mechanical structure. The other is turned on or off under the direct drive of an electromagnetic coil. However, both valves have certain limitations. For pneumatically controlled surge prevention valves, either balanced (front-back pressure difference of throttle valves) surge prevention valves or supercharge pressure compensation type (front-back pressure difference of throttle valves and upstream-downstream pressure difference of valve plates of surge prevention valves) surge prevention valves have certain application limitations. Especially for a gas engine with an EGR system meeting the National VI emission standard, the front-back pressure difference of throttle valves is large, the variability is large, the power of the engine is highly demanded, and the conventional pneumatic surge prevention valves have been difficult to meet development needs. Although an electrically controlled surge prevention valve is flexible to control, for a supercharged engine, especially a heavy-duty supercharged engine, the mass flow of supercharged air needing to be discharged is large in order to avoid surge of a supercharger when a throttle valve is suddenly released due to its high supercharging level, and the lifting force of an electromagnetic coil of the electrically controlled surge prevention valve needs to be large, resulting in high cost of the electromagnetic coil.

SUMMARY OF THE INVENTION

The first objective of the present invention is directed to an electrically controlled pneumatic surge prevention device, which can provide effective and reliable surge prevention and reduce costs.

The second objective of the present invention is directed to a control method of the device.

To achieve the first objective, an electrically controlled pneumatic surge prevention device is provided. The device includes a controller, an air filter, a turbocharger, an intercooler, a throttle valve, and air pipes. The air pipes include a first air pipe, a second air pipe, a third air pipe, a fourth air pipe, a fifth air pipe, and a sixth air pipe. The device further includes an electromagnetic valve connected using signals to the controller, and a surge prevention valve connected to the electromagnetic valve. The surge prevention valve is connected to the sixth air pipe connecting the intercooler and the throttle valve via the fourth air pipe. The electromagnetic valve is arranged at the third air pipe, and the surge prevention valve is connected to the second air pipe connecting the air filter and the turbocharger via the third air pipe.

Preferably, the surge prevention valve includes a housing, a first connecting port connected to the fourth air pipe, a second connecting port connected to the second air pipe, a valve plate connected to the first connecting port, a balance pressure chamber and a diaphragm connected to the valve plate, and a pressure sampling tube connected to the first connecting port and the balance pressure chamber after passing through the valve plate. The first connecting port is connected to the second connecting port via the valve plate. The balance pressure chamber is connected to the second air pipe via the third air pipe.

Preferably, a spring is arranged in the balance pressure chamber. The spring is connected to the valve plate to provide a set pressure for the valve plate. The balance pressure chamber maintains an air pressure balance with the first connecting port via the pressure sampling tube.

Preferably, the electromagnetic valve and the third air pipe are able to be arranged inside the surge prevention valve.

Preferably, the valve plate is arranged in the second connecting port and separates the balance pressure chamber from the second connecting port via the diaphragm.

To achieve the second objective, an electrically controlled pneumatic surge prevention control method is provided. The method includes following processing steps.

Step 1, starting an engine, obtaining, by a balance pressure chamber in a surge prevention device, an air pressure identical to that at a front end of a throttle valve, and keeping the air pressure to be identical all the time to close a port of the surge prevention device connected to the throttle valve.

Step 2, when an entire vehicle is decelerating, reducing an opening degree of the throttle valve, controlling, by a controller, the air pressure in the balance pressure chamber to be reduced, and opening the port of the surge prevention device connected to the throttle valve, so as to enable air at the front end of the throttle valve to be discharged via the surge prevention device, and reduce the air pressure of the front end of the throttle valve to implement surge prevention of a turbocharger.

Step 3, when the entire vehicle is accelerating, controlling, by the controller, the balance pressure chamber to recover the air pressure identical to that at the front end of the throttle valve, and keeping the air pressure to be identical all the time.

Preferably, in step 2, the controller controls the air pressure in the balance pressure chamber by controlling an electromagnetic valve, when the entire vehicle is decelerating, the controller controls the electromagnetic valve to be turned on, and when the air pressure of the front end of the throttle valve is reduced to a set value, the controller controls the electromagnetic valve to be turned off, such that the balance pressure chamber recovers the air pressure identical to that at the front end of the throttle valve to close the port of the surge prevention device connected to the throttle valve.

Preferably, in step 2, the air in the balance pressure chamber and the air at the front end of the throttle valve are both discharged to an air input end of the turbocharger.

Preferably, a pressure device is arranged in the balance pressure chamber to close the port of the surge prevention device connected to the throttle valve when a pressure difference between the front end of the throttle valve and the air input end of the turbocharger is lower than a set value.

Compared with the prior art, the present invention has the following beneficial effects:

In the present invention, electrically controlled pneumatic surge prevention is implemented by adding the surge prevention valve at a front end of the throttle valve and an air input end of the turbocharger and by utilizing the controller to control the surge prevention valve. The embodiments are utilized to provide effective and reliable surge prevention and to reduce costs. In the present invention, the electromagnetic valve is used to control the balance chamber pressure of the surge prevention valve to replace a control manner in which the balance chamber pressure of a conventional pneumatic surge prevention valve is equal to the back pressure of the throttle valve, the controller may effectively distinguish working conditions in which the surge prevention valve needs to participate in operation, the surge of the turbocharger is eliminated, and the problems of unstable engine control and poor driving comfort of a vehicle due to abnormal opening caused by a manner of operating the conventional pneumatic surge prevention valve by sensing the front-back pressure difference of the throttle valve are avoided. In the present invention, the electromagnetic valve, instead of a conventional electrically controlled surge prevention valve, is used to control the balance chamber pressure of the surge prevention valve, a small electromagnetic coil can be used to control the operation of the surge prevention valve, coil costs are low, required driving current is low, energy consumption is low, and reliability is good.

DESCRIPTION OF THE EMBODIMENTS

The present invention is further described below with reference to embodiments, but does not constitute any limitation to the present invention, and any finite number of modifications made within the scope of the claims of the present invention are still within the scope of the claims of the present invention.

Figure 1:
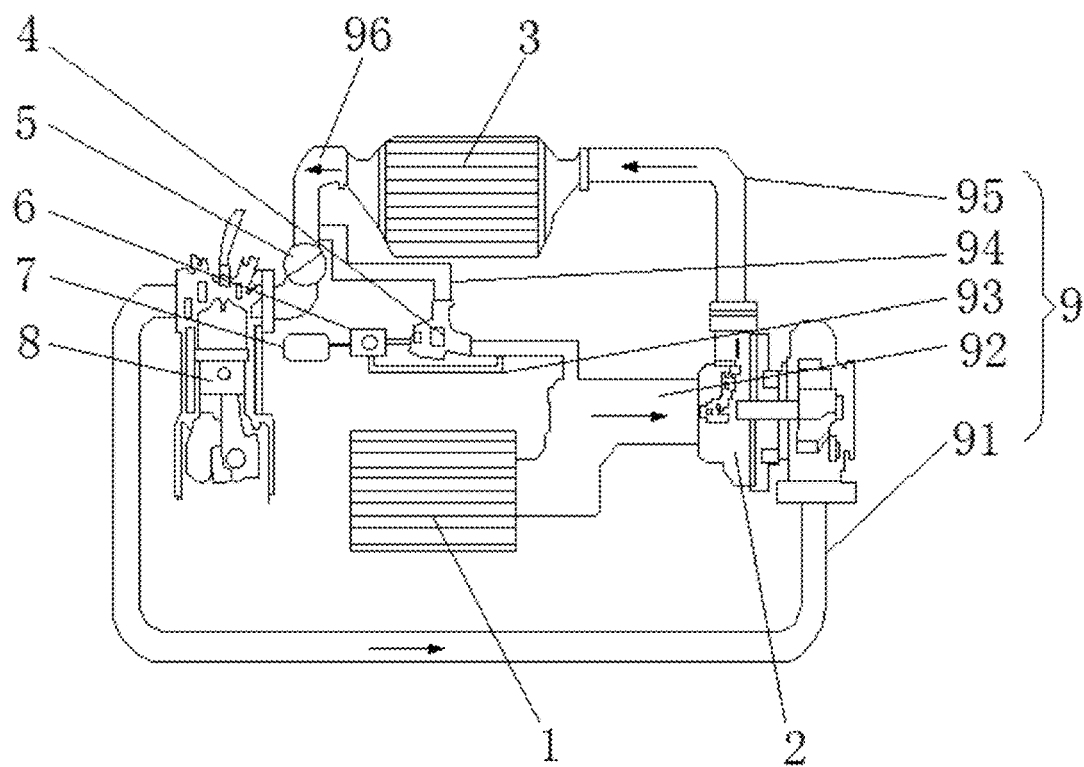
FIG. 1 is a schematic structural view of the present invention.

As shown in FIG. 1, the present invention provides an electrically controlled pneumatic surge prevention device, including a controller 7, an air filter 1, a turbocharger 2, an intercooler 3, a throttle valve 5, and air pipes 9. The air pipes 9 includes a first air pipe 91, a second air pipe 92, a third air pipe 93, a fourth air pipe 94, a fifth air pipe 95, and a sixth air pipe 96. The air filter 1 is connected to the turbocharger 2 via the second air pipe 92. The turbocharger 2 is connected to the intercooler 3 via the third air pipe 93. The intercooler 3 is connected to an engine 8 via the sixth air pipe 96. The engine 8 is connected to the turbocharger 2 via the first air pipe 91. The throttle valve 5 is arranged at the sixth air pipe 96. The device further includes an electromagnetic valve 6 connected using signals to the controller 7, and a surge prevention valve 4 connected to the electromagnetic valve 6. The surge prevention valve 4 is connected to the sixth air pipe 96 between the intercooler 3 and the throttle valve 5 via the fourth air pipe 94. The electromagnetic valve 6 is arranged at the third air pipe 93, and the surge prevention valve 4 is connected to the second air pipe 92 via the third air pipe 93.

Figure 2:
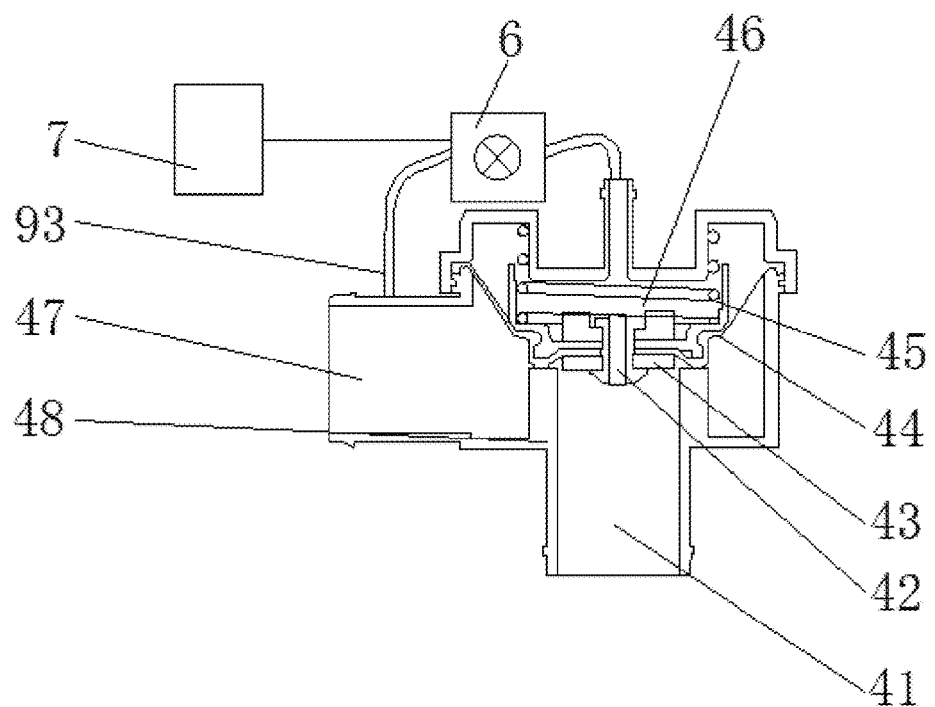
FIG. 2 is a schematic view of a separated structure of a surge prevention valve in the present invention.

As shown in FIG. 2, the surge prevention valve 4 includes a housing 48, a first connecting port 41 connected to the fourth air pipe 94, a second connecting port 47 connected to the second air pipe 92, a valve plate 43 connected to the first connecting port 41, a balance pressure chamber 46 and a diaphragm 44 connected to the valve plate 43, and a pressure sampling tube 42 connected to the first connecting port 41 and the balance pressure chamber 46 after passing through the valve plate 43. The first connecting port 41 is connected to the second connecting port 47 via the valve plate 43. A spring 45 is arranged in the balance pressure chamber 46. The spring 45 is connected to the valve plate 43 to provide a set pressure for the valve plate 43. The balance pressure chamber 46 maintains an air pressure balance with the first connecting port 41 via the pressure sampling tube 42. The valve plate 43 is arranged in the second connecting port 47 and separates the balance pressure chamber 46 from the second connecting port 47 via the diaphragm 44. The balance pressure chamber 46 is connected via the third air pipe 93 to the second air pipe 92.

Figure 3:
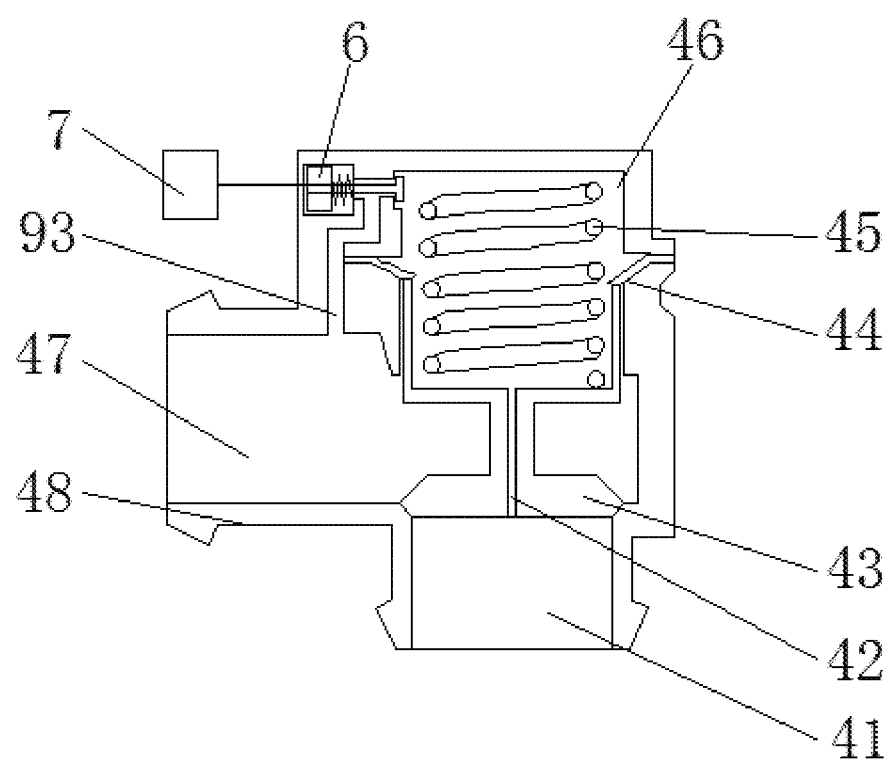
FIG. 3 is a schematic view of an integrated structure of a surge prevention valve in the present invention.

As shown in FIG. 3, the electromagnetic valve 6 and the third air pipe 93 may also be arranged inside the surge prevention valve 4. The practicability of the surge prevention valve 4 may be improved for the ingenious structure.

In the present embodiment, an air pressure of the first connecting port 41 is an air pressure of a front end of the throttle valve 5, and an air pressure of the second connecting port 47 is an air pressure of a front end of the turbocharger 2.

Figure 4:
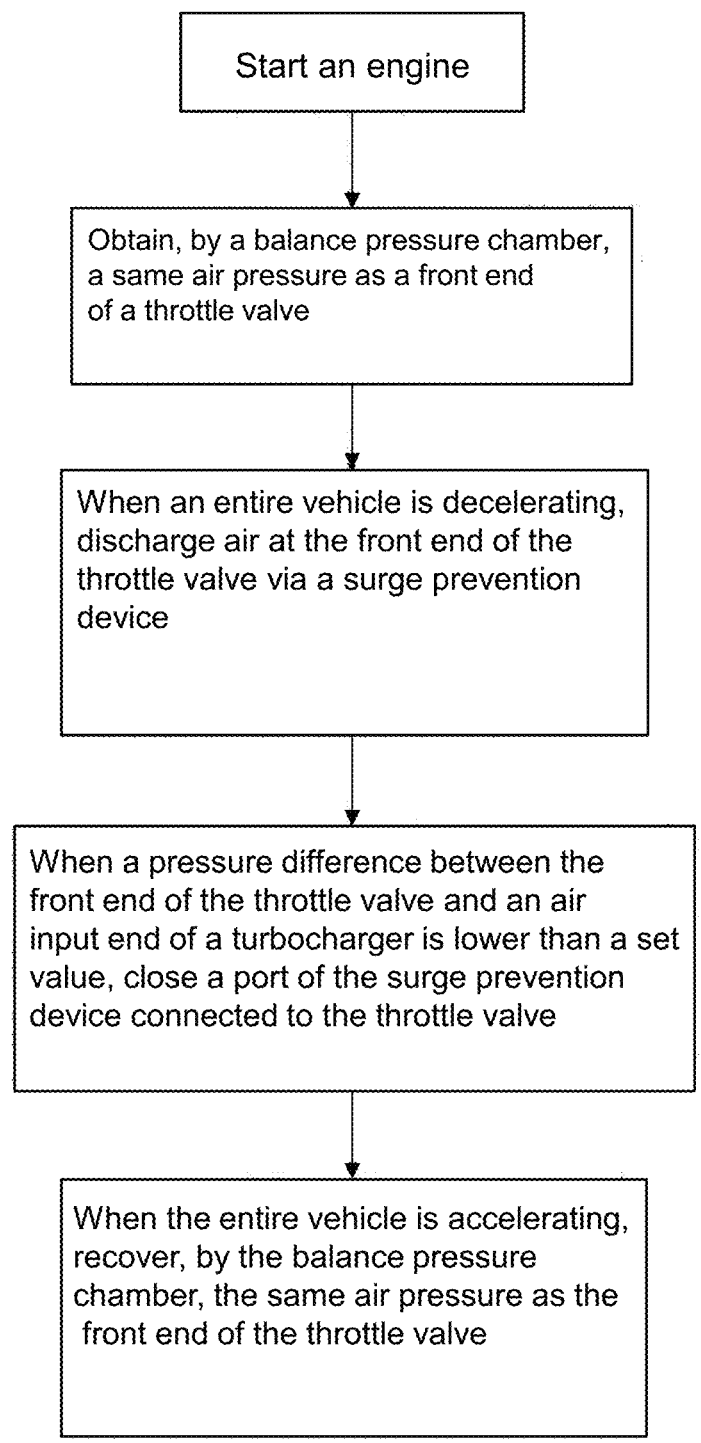
FIG. 4 is a flowchart of a method in the present invention.

As shown in FIG. 1 and FIG. 4, the present invention also provides an electrically controlled pneumatic surge prevention control method. The method includes the following processing steps.

Step 1: Start an engine, obtain, by a balance pressure chamber 46 in a surge prevention device, a same air pressure as a front end of a throttle valve 5, and remain the same air pressure all the time to close a port of the surge prevention device connected to the throttle valve 5.

Step 2: When an entire vehicle is decelerating, reduce an opening degree of the throttle valve 5, control, by a controller 7, the air pressure in the balance pressure chamber 46 to be reduced, and open the port of the surge prevention device connected to the throttle valve 5, so that air at the front end of the throttle valve 5 is discharged via the surge prevention device, and the air pressure of the front end of the throttle valve 5 is reduced to implement surge prevention of a turbocharger 2.

Step 3: When the entire vehicle is accelerating, control, by the controller 7, the balance pressure chamber 46 to recover the same air pressure as the front end of the throttle valve 5, and remain the same air pressure all the time.

In step 2, the controller 7 controls the air pressure in the balance pressure chamber 46 by controlling an electromagnetic valve 6, when the entire vehicle is decelerating, the controller 7 controls the electromagnetic valve 6 to be turned on, and when the air pressure of the front end of the throttle valve 5 is reduced to a set value, the controller 7 controls the electromagnetic valve 6 to be turned off, such that the balance pressure chamber 46 recovers the same air pressure as the front end of the throttle valve 5 to close the port of the surge prevention device connected to the throttle valve 5.

In step 2, the air in the balance pressure chamber 46 and the air at the front end of the throttle valve 5 are both discharged to an air input end of the turbocharger 2.

A pressure device is arranged in the balance pressure chamber 46 to close the port of the surge prevention device connected to the throttle valve 5 when a pressure difference between the front end of the throttle valve 5 and the air input end of the turbocharger 2 is lower than a set value.

An operating process of the present embodiment is as follows. After the entire machine is started, the balance pressure chamber 46 in the surge prevention valve 4 maintains the equal balanced air pressure with the front end of the throttle valve 5 via the pressure sampling tube 42. When the entire machine is decelerating in operation, the throttle valve 5 is closed, the controller 7 controls the electromagnetic valve 6 to be turned on, and air in the balance pressure chamber 46 flows to the second air pipe 92 via the third air pipe 93 to cause the air pressure in the balance pressure chamber 46 to be lower than the air pressure of the front end of the throttle valve 5, so that the valve plate 43 is turned on under the action of the air pressure, the air at the front end of the throttle valve 5 flows to the second air pipe 92, and when the air pressure of the front end of the throttle valve 5 is reduced to be lower than the pressure of the spring 45, the spring 45 acts to push back the valve plate 43 to stop the air at the front end of the throttle valve 5 from flowing to the second air pipe 92. Meanwhile, when the air pressure of the front end of the throttle valve 5 is reduced to a set value, the controller 7 controls the electromagnetic valve 6 to be turned off, such that when the entire machine accelerates next time, the balance pressure chamber 46 in the surge prevention valve 4 maintains the equal balanced air pressure with the front end of the throttle valve 5 again via the pressure sampling tube 42. Therefore, surge of the turbocharger 2 caused by the sudden decrease of the required air volume due to the sudden release of the throttle valve is eliminated, and the influence on engine acceleration performance caused by slow establishment of the supercharged pressure due to not closing of the valve plate of the conventional balanced pneumatic surge prevention valve is avoided.

Figure 5:
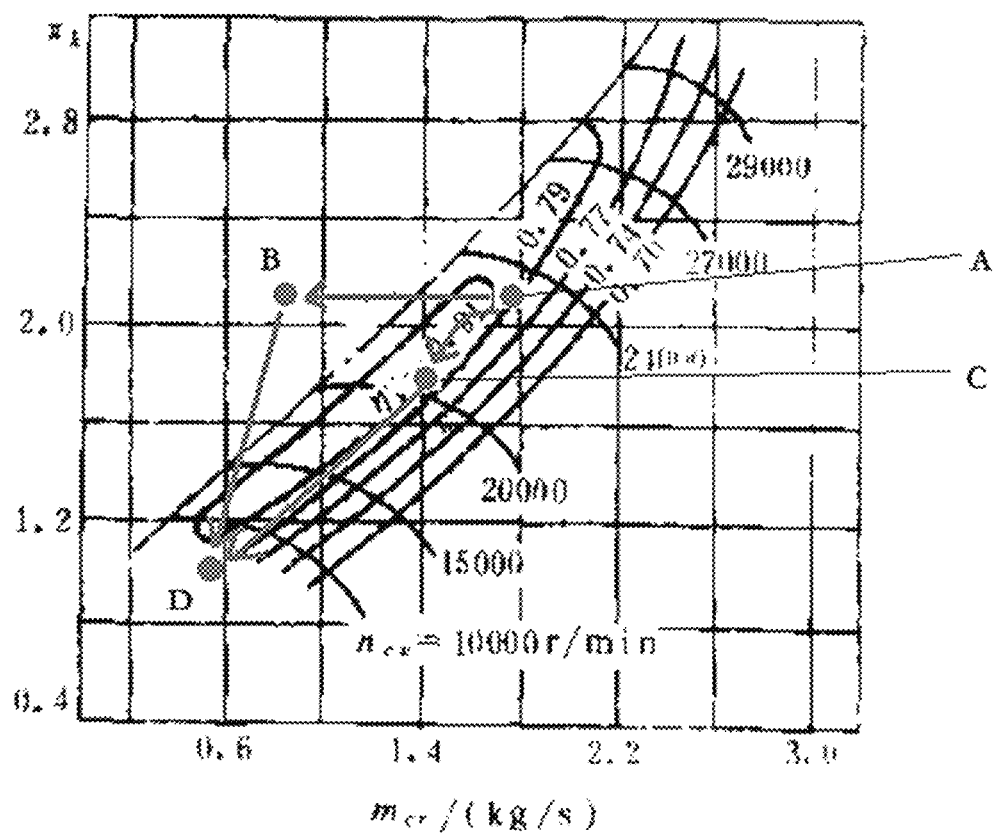
FIG. 5 is a schematic view of surge of a turbocharger in the present invention.

As shown in FIG. 5, compared with the operating effect of a conventional turbocharger without a surge prevention valve, it can be seen that in the present invention, when the engine suddenly releases the throttle valve, the compressor outlet pressure of the turbocharger 2 does not change, and the flow rate is drastically reduced to cause the pressure of the rear end of the turbocharger 2 to increase. The conventional turbocharger without the surge prevention valve operates in a path A→B→D, so that the turbocharger 2 operates to enter a surge region, thereby causing surge damage of the turbocharger 2. In the present invention, when the throttle valve is suddenly released, air under an air compressor outlet pressure drastically reduced due to the sudden release of the throttle valve is discharged by turning on the surge prevention valve, an operation path from A→C→D is realized, and surge of the turbocharger caused by entry into a surge region is avoided.

The present invention is utilized to provide effective and reliable surge prevention, to reduce costs, and to improve driving comfort.

The above is only a preferred implementation of the present invention, and it should be noted that those skilled in the art can make various modifications and improvements without departing from the structure of the present invention, and such modifications and improvements do not affect the implementation effects and applicability of the present invention.

What is claimed is:

1. An electrically controlled pneumatic surge prevention device, comprising:
   a controller,
   an air filter,
   a turbocharger,
   an intercooler,
   a throttle valve, and
   air pipes, the air pipes comprising
      a first air pipe,
      a second air pipe,
      a third air pipe,
      a fourth air pipe,
      a fifth air pipe, and
      a sixth air pipe,
   wherein the electrically controlled pneumatic surge prevention device further comprising an electromagnetic valve in signal with the controller, and a surge prevention valve connected to the electromagnetic valve,
   wherein the surge prevention valve is connected to the sixth air pipe connecting the intercooler and the throttle valve via the fourth air pipe, the electromagnetic valve is arranged at the third air pipe, and the surge prevention valve is connected to the second air pipe connecting the air filter and the turbocharger via the third air pipe,
   wherein the surge prevention valve comprises a housing, a first connecting port connected to the fourth air pipe, a second connecting port connected to the second air pipe, a valve plate connected to the first connecting port, a balance pressure chamber and a diaphragm connected to the valve plate, and a pressure sampling tube connected to the first connecting port and the balance pressure chamber after passing through the valve plate, the first connecting port is connected to the second connecting port via the valve plate, and the balance pressure chamber is connected to the second air pipe via the third air pipe.

2. The electrically controlled pneumatic surge prevention device according to claim 1, wherein a spring is arranged in the balance pressure chamber, the spring is connected to the valve plate to provide a set pressure for the valve plate, and the balance pressure chamber maintains an air pressure balance with the first connecting port via the pressure sampling tube.

3. The electrically controlled pneumatic surge prevention device according to claim 1, wherein the valve plate is arranged in the second connecting port and separates the balance pressure chamber from the second connecting port via the diaphragm.

4. The electrically controlled pneumatic surge prevention device according to claim 1, wherein the electromagnetic valve and the third air pipe are able to be arranged inside the surge prevention valve.

5. An electrically controlled pneumatic surge prevention control method of the surge prevention device according to claim 1, the electrically controlled pneumatic surge prevention control method comprising the following processing steps:
  step 1, starting an engine, obtaining, by the balance pressure chamber in a surge prevention device, a same air pressure as a front end of the throttle valve, and keeping the same air pressure all the time to close a port of the surge prevention device connected to the throttle valve;
  step 2, when an entire vehicle is decelerating, reducing an opening degree of the throttle valve, controlling, by the controller, the air pressure in the balance pressure chamber to be reduced, and opening the port of the surge prevention device connected to the throttle valve, so as to enable air at the front end of the throttle valve to be discharged via the surge prevention device, and reduce the air pressure of the front end of the throttle valve to implement surge prevention of the turbocharger; and
  step 3, when the entire vehicle is accelerating, controlling, by the controller, the balance pressure chamber to recover the same air pressure as the front end of the throttle valve, and keeping the same air pressure all the time.

6. The electrically controlled pneumatic surge prevention control method according to claim 5, wherein in step 2, the controller controls the air pressure in the balance pressure chamber by controlling the electromagnetic valve, when the entire vehicle is decelerating, the controller controls the electromagnetic valve to be turned on, and when the air pressure of the front end of the throttle valve is reduced to a set value, the controller controls the electromagnetic valve to be turned off, such that the balance pressure chamber recovers the same air pressure as at the front end of the throttle valve to close the port of the surge prevention device connected to the throttle valve.

7. The electrically controlled pneumatic surge prevention control method according to claim 6, wherein in step 2, the air in the balance pressure chamber and the air at the front end of the throttle valve are both discharged to an air input end of the turbocharger.

8. The electrically controlled pneumatic surge prevention control method according to claim 6, wherein a pressure device is arranged in the balance pressure chamber to close the port of the surge prevention device connected to the throttle valve when a pressure difference between the front end of the throttle valve and the air input end of the turbocharger is lower than a set value.

9. The electrically controlled pneumatic surge prevention control method according to claim 5, wherein in step 2, the air in the balance pressure chamber and the air at the front end of the throttle valve are both discharged to an air input end of the turbocharger.

10. The electrically controlled pneumatic surge prevention control method according to claim 5, wherein a pressure device is arranged in the balance pressure chamber to close the port of the surge prevention device connected to the throttle valve when a pressure difference between the front end of the throttle valve and the air input end of the turbocharger is lower than a set value.

\* \* \* \* \*